(12) United States Patent
Wendler et al.

(10) Patent No.: US 12,460,068 B2
(45) Date of Patent: Nov. 4, 2025

(54) BIOMIMETIC SYNTHETIC RUBBER

(71) Applicant: Fraunhofer-Gesellschaft zur Foderung der angewandten Forschung e.V., Munich (DE)

(72) Inventors: Ulrich Wendler, Halle (DE); Marlen Malke, Halle (DE); Lowis-Gerrit-Boje Müller, Rheine (DE); Christian Schulze Gronover, Münster (DE); Dirk Prüfer, Münster (DE); Jacqueline Wötzel, Teutschenthal (DE); Mario Beiner, Schkopau (DE); Gaurav Gupta, Halle (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 817 days.

(21) Appl. No.: 17/269,555

(22) PCT Filed: Aug. 27, 2018

(86) PCT No.: PCT/EP2018/072997
§ 371 (c)(1),
(2) Date: Feb. 19, 2021

(87) PCT Pub. No.: WO2020/043268
PCT Pub. Date: Mar. 5, 2020

(65) Prior Publication Data
US 2021/0221980 A1 Jul. 22, 2021

(51) Int. Cl.
*C08L 9/00* (2006.01)
*C09K 3/10* (2006.01)

(52) U.S. Cl.
CPC ........ *C08L 9/00* (2013.01); *C09K 2003/1068* (2013.01)

(58) Field of Classification Search
CPC ..................................................... C08L 9/00
See application file for complete search history.

(56) References Cited

U.S. PATENT DOCUMENTS

| | | | |
|---|---|---|---|
| 4,906,706 A | 3/1990 | Hattori et al. | |
| 8,232,352 B2 | 7/2012 | Matsushita et al. | |
| 8,258,241 B2 | 9/2012 | Tanaka et al. | |
| 8,314,189 B2 | 11/2012 | Luo et al. | |
| 9,035,005 B2 | 5/2015 | Mazumdar et al. | |
| 9,481,746 B2 | 11/2016 | Lee et al. | |
| 2003/0135006 A1* | 7/2003 | Materne | C08K 5/175 528/10 |
| 2009/0292043 A1* | 11/2009 | Kurazumi | C08L 15/00 525/333.2 |

FOREIGN PATENT DOCUMENTS

| | | |
|---|---|---|
| CN | 101225134 A | 7/2008 |
| CN | 101765632 A | 6/2010 |
| CN | 107474173 A | 12/2017 |
| EP | 1099711 A2 | 9/2001 |
| EP | 1873168 A1 | 1/2008 |
| EP | 2022803 A2 | 2/2009 |
| EP | 1939221 A2 | 7/2009 |
| EP | 3301131 A1 | 4/2018 |
| JP | 2017186434 A * | 10/2017 |
| RU | 2486209 C2 | 6/2013 |
| WO | 2011/045393 A1 | 4/2011 |

OTHER PUBLICATIONS

Machine translation of JP-2017186434-A (Year: 2017).*
Chu, Hualei, et al., "A novel Phosphatidylcholine-modi fied polyisoprene: synthesis and Characterization", Springer-Verlag Berlin Heidelberg 2015.
Sakdapipanich, Jitladda, et al., "Strain-Induced Crystallization of Natural Rubber: Effect of Proteins and Phospholipids", Rubber Chemistry and Technology, vol. 81, 2008.
Zhang, Zhichao, et al., "Polimerization of 1,3-Conjugated Dienes with Rare-Earth Metal Precursors", Struct Bond (2010) 137: 49-108.
Applicant: Fraunhofer-Gesellschaft Zur Forderung Der Angewandten Forschung E.V.; Russian Application No. 2021105880/4(012791); Filed: Aug. 27, 2018; Office Action dated Sep. 16, 2021; 12 pgs.
Applicant: Fraunhofer-Gesellschaft Zur Forderung Der Angewandten Forschung E.V.; Russian Application No. 2021105880/4(012791); Filed: Aug. 27, 2018; Search Report dated Sep. 15, 2021; 4 pgs.
Applicant: Fraunhofer-Gesellschaft Zur Forderung Der Angewandten Forschung E.V.; "Biomimetic Synthetic Rubber"; Chinese Application No. 201880097920.6; Chinese Office Action dated Dec. 22, 2022; 20 pgs.

* cited by examiner

*Primary Examiner* — Wenwen Cai
(74) *Attorney, Agent, or Firm* — Tarolli, Sundheim, Covell & Tummino LLP

(57) ABSTRACT

The present invention relates to a composition comprising (i) a crosslinkable synthetic cis-1,4-polydiene having a cis content of at least 95% and a functional group in the terminal position, and (ii) an amphiphilic compound.

10 Claims, No Drawings

BIOMIMETIC SYNTHETIC RUBBER

The present invention relates to a biomimetic synthetic rubber composition that exhibits a high degree of strain crystallization and is accordingly very suitable for the production of rubber-elastic shaped bodies that are exposed to high mechanical loads (in particular tires or their treads) or are used as special medical devices (e.g. hoses).

The elastic properties of elastomers obtained from natural or synthetic rubbers by crosslinking ("vulcanization"), which are also referred to simply as rubber, permit diverse use in a wide range of areas, e.g. for tires, medical devices (e.g. protective gloves and condoms) or other industrial rubber goods.

Known examples of synthetic rubbers include polymers obtained by polymerizing 1,3-diene compounds such as 1,3-butadiene or isoprene (2-methylbuta-1,3-diene).

In the polymerization of 1,3-dienes such as isoprene or 1,3-butadiene, the repeat units of the polymer can arise in different isomeric forms (e.g. the cis-1,4 or trans-1,4 form), depending on the catalyst used.

The industrially relevant form of polyisoprene is primarily cis-1,4-polyisoprene (i.e. a polyisoprene having a high proportion of repeat units that are present in the cis-1,4 form).

Anionic chain polymerization of isoprene is known, which is initiated for example by an organolithium compound such as butyllithium. Anionic polymerization of isoprene usually results in a proportion of the cis-1,4 form of less than 95%.

The coordination polymerization of isoprene in the presence of a coordination catalyst is also known. Coordination polymerization allows a polyisoprene having a cis content of at least 95% or even at least 97% to be obtained.

Polybutadiene can likewise be produced by anionic chain polymerization or by coordination polymerization, with cis-1,4-polybutadiene having a high cis content accessible in particular via coordination polymerization.

A suitable coordination catalyst for the selective production of a cis-1,4-polydiene having a very high cis content is for example a Ziegler-Natta catalyst comprising a transition metal or a rare earth metal and usually an organoaluminum compound.

Coordination catalysts for the selective production of cis-1,4-polydienes are described for example by Z. Zhang et al., Structure and Bonding, vol. 137, 2010, pp. 49-108 and in WO 2011/045393 A1.

For tire production, the elastomers are mixed with fillers such as $SiO_2$ and carbon black. Providing the polymer with functional polar groups is known in this context. This can be done for example after the polymerization, when the catalytically active species is still present at the ends of the polymer chains. Adding suitable "modifier compounds" allows terminal functional groups (e.g. acidic or basic groups) to be attached to the polymer. This is also referred to as end-group functionalization, the polymers thus obtained being end-group-functionalized polymers.

Anionic polymerization in particular is very suitable for the end-group functionalization of polymers. However, the introduction of terminal functional groups into the polymer is known for coordination polymerization too.

The attachment of terminal functional groups to cis-1,4-polydienes produced via a coordination polymerization in the presence of a coordination catalyst is described for example in EP 1 873 168 A1, EP 1 939 221 A2 and EP 2 022 803 A2. For the production of a tire composition, these end-group-functionalized polymers are mixed with suitable fillers such as carbon black or $SiO_2$ or other inorganic additives.

Natural rubber (or the elastomer obtained after it has undergone crosslinking) has exceptional properties in some fields of application that it has thus far been impossible to achieve with conventional synthetic rubbers such as synthetic polyisoprene or polybutadiene. This behavior of natural rubber is due to a shear-induced crystallization or strain crystallization (i.e. a spontaneous, reversible stiffening of the material on deformation under mechanical stress), which takes place in synthetic elastomers with significantly lower intensity.

Natural rubber is obtained from the rubber tree *Hevea brasiliensis* and therefore has the disadvantage of being available only in finite quantity.

In the medical sector in particular, natural rubber is also disadvantageous because of its allergenic potential ("latex allergy"). This allergenic potential is due to the presence of proteins in natural rubber.

J. Sakdapipanich et al., *Rubber Chemistry and Technology*, November 2008, vol. 81, pp. 753-766, examined the strain crystallization of natural rubber and of modified, protein- and/or lipid-free natural rubber freed of proteins and/or lipids by appropriate enzyme treatment. The enzymatic removal of proteins and lipids resulted in a reduction in the shear-induced crystallizability of natural rubber. When the separated lipid component is added back to the lipid- and protein-free natural rubber, the composition thus obtained even shows a further decrease in strain crystallization.

Because of the disadvantages of natural rubber outlined above (finite availability, allergenic potential), there is interest in compositions that are based on synthetic elastomers and yet exhibit strain crystallization to a degree as close as possible to that of natural rubber. US 2014/0343231 A1 describes a polydiene such as polyisoprene or polybutadiene that is produced via an anionic polymerization accompanied by the attachment in the terminal position of a reactive functional group, in particular a maleimide group. A further polymer, for example a polyacrylamide, is then grafted onto this terminal functional group.

H. Chu et al., *Colloid and Polymer Science*, February 2016, vol. 294, pp. 433-439, describe the production of a chemically modified polyisoprene. The starting material used was a polyisoprene having a cis content of 73% produced via an anionic polymerization. Methyl groups in non-terminal monomer units were converted into carboxyl-containing groups and phosphatidylcholine molecules were then covalently attached to these non-terminal carboxyl groups by chemical reaction.

It is an object of the present invention to provide a composition that is obtainable via a simple process, is based on synthetic elastomers and yet exhibits strain crystallization to a degree as close as possible to that of natural rubber.

The object is achieved by a crosslinkable composition comprising
   a crosslinkable synthetic cis-1,4-polydiene having a cis content of at least 95% and a functional group in the terminal position,
   an amphiphilic compound.

With the composition according to the invention, which comprises (i) a cis-1,4-polydiene having a high cis content and a terminal functional group and (ii) an amphiphilic compound, an elastomer can be obtained after crosslinking in which the strain crystallization corresponds almost to that of natural rubber.

Polymers in which a functional group is introduced in the terminal position are also referred to as end-group-functionalized polymers.

The use of a synthetic cis-1,4-polydiene instead of a natural rubber results in a chemically more uniform material, a very homogeneous mixture with the amphiphilic compound, and good processability (since mastication, i.e. mechanical breakdown of long-chain rubber molecules, is no longer necessary). Moreover, unlike natural rubber, it is unaffected by seasonal variation.

As is known to those skilled in the art, the cis content indicates the relative proportion of the repeat units of the polymer that are present in the cis-1,4 form.

The cis content is determined by NMR spectroscopy. The procedure for this is as follows:

$^1$H-NMR spectroscopy with field strengths of at least 400 MHz (based on proton resonance) is used to determine the ratio between the 1,2-linkage ("vinyl fraction") and the 1,4-linkage. The chemical shift (measured in $CDCl_3$) in polyisoprene is within a range of 4.68-4.76 ppm for the 1,2-linkage (terminal protons of the vinyl group) and within a range of 5.13 ppm for the 1,4-linkage (olefinic protons). The two possible 1,4-linkages (cis and trans) are distinguished by $^{13}$C-NMR spectroscopy (preferably likewise at least 400 MHz instruments), the differences in chemical shift in the $^1$H-NMR spectrum being detectable only at very high magnetic field strengths (well above 400 MHz instruments). The chemical shifts in the $^{13}$C-NMR spectrum are, for polyisoprene by way of example, at 23.4 ppm for cis and at 17.2 ppm for trans (methyl groups). The respective proportions are determined by integration; it is important here to ensure adequate baseline quality, which can be achieved for example by high signal accumulation.

The cis-1,4-polydiene, in particular cis-1,4-polyisoprene, preferably has a cis content of at least 96% or even at least 97%.

The cis-1,4-polydiene is preferably cis-1,4-polyisoprene or cis-1,4-polybutadiene or a mixture of these two polymers.

In the case of cis-1,4-polyisoprene, isoprene is preferably used as the sole monomer for the polymerization and, for cis-1,4-polybutadiene, 1,3-butadiene is preferably used as the sole monomer for the polymerization. Thus, cis-1,4-polyisoprene preferably comprises exclusively monomer units derived from isoprene and cis-1,4-polybutadiene preferably comprises exclusively monomer units derived from 1,3-butadiene.

The synthetic cis-1,4-polydiene is preferably produced via a coordination polymerization in the presence of a coordination catalyst.

Coordination catalysts for the selective production of cis-1,4-polydienes are described for example by Z. Zhang et al., Structure and Bonding, vol. 137, 2010, pp. 49-108 and in WO 2011/045393 A1.

The coordination catalyst preferably comprises a transition metal (e.g. titanium) and/or a rare earth metal. The rare earth metal is for example a lanthanoid (such as neodymium). In addition, the coordination catalyst may comprise for example an organoaluminum compound.

A suitable coordination catalyst for production of the cis-1,4-polydiene having a cis content of at least 95% is e.g. a Ziegler-Natta catalyst.

The use of a coordination catalyst for the polymer synthesis means there may also be a transition metal and/or a rare earth metal contained in the cis-1,4-polydiene in the composition according to the invention. These metals may be present in small amounts in the polydiene and originate from the catalyst used in the production process.

The synthetic production of the cis-1,4-polydiene allows the molar mass to be set exactly and thus can be employed directly in the production of elastomer components without the mastication step for molar mass reduction that is necessary with natural rubber. The cis-1,4-polydiene has for example a number-average molar mass Mn within a range of 250-400 kg/mol. The polydispersity Mw/Mn is for example within a range of 2.0-2.8, where Mw is the weight-average molar mass. The synthetic cis-1,4-polydiene is preferably exclusively linear. In contrast to natural rubber, disruptive gel components (partially crosslinked structures; detection based on GPC recovery) are absent or present only in very small quantities.

Suitable polymerization conditions for the production of cis-1,4-polydienes via a coordination polymerization are known to those skilled in the art. For example, the polymerization is carried out in solution. The polymerization temperature is for example within a range of 35-80° C., more preferably 40-60° C., and the monomer concentration in the polymerization medium (e.g. in the solution) is for example within a range of 5-40% by weight, more preferably 10-30% by weight.

As already mentioned above, the synthetic cis-1,4-polydiene has a functional group in the terminal position. Polymers in which a functional group is introduced in the terminal position are also referred to as end-group-functionalized polymers.

The functional group may be for example an acidic or basic group.

The functional group is e.g. a carboxyl or carboxylate, hydroxyl, amine or ammonium, ester or cyano group.

The end-group functionalization of the synthetic cis-1,4-polydiene may for example be effected exclusively through a particular functional group (e.g. a carboxyl or carboxylate group). Alternatively, it is also possible for the end-group functionalization of the synthetic cis-1,4-polydiene to introduce two or more functional groups (e.g. in a two-stage or multistage end-group functionalization process).

In a preferred embodiment, the functional group in the terminal position of the synthetic cis-1,4-polydiene is a carboxyl or carboxylate group.

The attachment of terminal functional groups in cis-1,4-polydienes produced via a coordination polymerization in the presence of a coordination catalyst is known and is described for example in EP 1 873 168 A1, EP 1 939 221 A2 and EP 2 022 803 A2.

For example, the cis-1,4-polydiene polymerization in the presence of the coordination catalyst is carried out until the degree of polymerization appropriate to the particular application has been attained, this being then followed by the addition of a modifier compound through which the terminal functional group is introduced into the polydiene. The modifier compound is for example added directly to the solution in which the polymerization has been carried out. The reaction of the cis-1,4-polydiene with the modifier compound may be carried out for example at a temperature that corresponds to the temperature used for the polymerization of the cis-1,4-polydiene. Alternatively, it is however also possible for higher temperatures to be used for the reaction of the cis-1,4-polydiene with the modifier compound.

Suitable modifier compounds for the end-group functionalization of polydienes are known to those skilled in the art. The modifier compound is for example an acid (in particular a carboxylic acid), an acid anhydride (for example $CO_2$ or a carboxylic anhydride), an amine or an ester or a combination of at least two of these compounds.

As set out above, in addition to the synthetic cis-1,4-polydiene having a high cis content and end-group functionalization, the composition according to the invention also comprises an amphiphilic compound.

The amphiphilic compound may be of natural origin or have been produced by chemical synthesis.

For example, the amphiphilic compound is a polar lipid, e.g. a phospholipid, a glycolipid or a mixture of these two polar lipids; a protein; a fatty acid or a salt of a fatty acid or a fatty acid derivative (e.g. a glycerol ester of a fatty acid); a surfactant (e.g. a nonionic surfactant, an anionic surfactant, a cationic surfactant or an amphoteric surfactant) or a mixture of at least two of the abovementioned amphiphilic compounds. To reduce the allergenic potential of the composition, it may be preferable that the amphiphilic compound is not a protein and the resulting composition is accordingly protein-free.

The proportion of the amphiphilic compound in the composition may be varied over a wide range depending on the intended use. For example, the composition according to the invention contains the amphiphilic compound in an amount of up to 30% by weight, more preferably up to 20% by weight, e.g. in an amount of 0.05% by weight to 30% by weight, more preferably 0.1% by weight to 20% by weight.

The cis-1,4-polydiene and the amphiphilic compound are preferably present in the form of a mixture. The amphiphilic compound is therefore preferably not covalently bonded (i.e. via a chemical bond) to the cis-1,4-polydiene.

One or more additives may optionally be added to the composition, depending on the envisaged use.

If the composition is to be used for example for tire production, carbon black and/or one or more inorganic fillers such as $SiO_2$ may be added to the composition.

For crosslinking of the polydiene, the composition may comprise one or more crosslinkers. Suitable crosslinkers are known to those skilled in the art. Examples include sulfur or peroxides.

The composition may be present in the form of a solid or else as a solution or dispersion.

The present invention also relates to a process for producing the composition described above, comprising the following process steps:
  producing a cis-1,4-polydiene having a cis content of at least 95% by a coordination polymerization in the presence of a coordination catalyst,
  attaching a functional group in the terminal position of the cis-1,4-polydiene,
  mixing the cis-1,4-polydiene with an amphiphilic compound.

With regard to suitable coordination catalysts and polymerization conditions and preferred properties of the cis-1,4-polydiene, reference can be made to the descriptions hereinabove.

Coordination catalysts for the selective production of cis-1,4-polydienes are described for example by Z. Zhang et al., Structure and Bonding, vol. 137, 2010, pp. 49-108 and in WO 2011/045393 A1.

The coordination catalyst preferably comprises a transition metal (e.g. titanium) and/or a rare earth metal. The rare earth metal is for example a lanthanoid (such as neodymium). In addition, the coordination catalyst may comprise for example an organoaluminum compound.

A suitable coordination catalyst for production of the cis-1,4-polydiene having a cis content of at least 95% is e.g. a Ziegler-Natta catalyst.

Suitable polymerization conditions for the production of cis-1,4-polydienes via a coordination polymerization are known to those skilled in the art. For example, the polymerization is carried out in solution. The polymerization temperature is for example within a range of 35-80° C., more preferably 40-60° C., and the monomer concentration in the polymerization medium (e.g. in the solution) is for example within a range of 5-40% by weight, more preferably 10-30% by weight.

Before mixing with the amphiphilic compound, the cis-1,4-polydiene is further subjected to end-group functionalization, i.e. a functional group is attached at the terminal position of the cis-1,4-polydiene. With regard to preferred terminal functional groups and suitable process conditions for the end-group functionalization of the cis-1,4-polydiene, reference can be made to the descriptions hereinabove.

The attachment of terminal functional groups in cis-1,4-polydienes produced via a coordination polymerization in the presence of a coordination catalyst is known and is described for example in EP 1 873 168 A1, EP 1 939 221 A2 and EP 2 022 803 A2.

For example, the polydiene polymerization in the presence of the coordination catalyst is carried out until the degree of polymerization appropriate to the particular application has been attained, this being then followed by the addition of a modifier compound through which the terminal functional group is introduced into the polydiene. The modifier compound is for example added directly to the solution in which the polymerization has been carried out.

Suitable modifier compounds for the end-group functionalization of polydienes are known to those skilled in the art. The modifier compound is for example an acid (in particular a carboxylic acid), an acid anhydride (for example $CO_2$ or a carboxylic anhydride), an amine or an ester or a combination of at least two of these compounds.

As already mentioned above, the functional group is e.g. a carboxyl or carboxylate, hydroxyl, amine or ammonium, ester or cyano group.

The mixing of the cis-1,4-polydiene with the amphiphilic compound may be effected by means of customary methods known to those skilled in the art.

The end-group-functionalized cis-1,4-polydiene may be mixed with the amphiphilic compound for example in the solution in which the prior polymerization and/or end-group functionalization has been carried out. Alternatively, the cis-1,4-polydiene may be separated from the solution in which the prior polymerization and/or end group functionalization has been carried out, optionally dissolved or dispersed in a liquid, and then mixed with the amphiphilic compound.

The cis-1,4-polydiene and the amphiphilic compound are preferably mixed with one another in a liquid medium. In order to achieve an efficient and homogeneous mixture, the cis-1,4-polydiene is preferably present as a solution in the liquid medium. Direct mixing of the amphiphilic compound into the cis-1,4-polydiene in an internal mixer, a roller mill or an extruder is also possible.

Suitable stirring devices in which the mixing of cis-1,4-polydiene with the amphiphilic compound may be carried out are known to those skilled in the art. For example, the stirring device may include a stirring and/or kneading unit. Internal mixers (e.g. a ram kneader), roller mills or extruders may also be used.

The present invention further relates to an elastomeric composition obtainable by crosslinking of the end-group-functionalized cis-1,4-polydiene in the composition described above.

Suitable conditions for the crosslinking of the cis-1,4-polydiene are known to those skilled in the art. For example, crosslinking is initiated by a suitable thermal treatment.

The present invention further relates to a shaped body that comprises the elastomeric composition described above.

Since the shaped body comprises the elastomeric composition, the shaped body can also be referred to as a rubber-elastic or elastomeric shaped body.

The shaped body is e.g. a tire, a medical device (e.g. a hose, protective glove or a condom) or an industrial rubber product (e.g. seals, sleeves, semifinished products).

The present invention further relates to the use of the crosslinkable composition described above for the production of a rubber-elastic shaped body, preferably a tire, in particular the tread of a tire, or a hose.

The present invention is elucidated in more detail by reference to the following examples.

EXAMPLES

Comparative Example 1

A cis-1,4-polyisoprene having a cis content of 98% was produced via a coordination polymerization in the presence of a neodymium-containing catalyst as follows:

Destabilized isoprene was initially charged in dried cyclohexane (10% by weight), the system was temperature-controlled at 50° C., and an Nd-containing catalyst (marketed by Comar Chemicals) dissolved in n-hexane (1.0% by volume based on monomer) was added, isothermal reaction time 3 h. The resulting polymer solution was stopped with isopropanol, stabilized with butylated hydroxytoluene and freed of solvent by coagulation/stripping.

The cis-1,4-polyisoprene produced was dissolved in chloroform (10% by weight). To the solution was additionally added 1% by weight of dicumyl peroxide (crosslinker) based on the polymer.

After stirring sufficiently vigorously, the solvent was evaporated. A film having a thickness of 1 mm was thermally treated at 160° C. to initiate crosslinking of the polyisoprene.

The strain crystallization was then determined for the crosslinked composition as follows:

Based on uniaxially stretched rubber strips, relative crystallinities were determined within a static stretch range of 0% to 650%. The method employed is based on the analysis of one-dimensional X-ray scattering data detected perpendicular to the direction of stretching. After quantifying the intensity (area evaluation) of the contributions of amorphous (halo) and crystalline scatter ((200) and (120) reflections), a relative degree of crystallization $D_{c,rel}=(I_{200}+I_{120})/(I_{halo}+I_{200}+I_{120})=I_{cryst}/I_{total}$ is determined as a function of static stretch $\varepsilon_{stat}$. The values for the relative degree of crystallization were calculated for 10-15 static stretches and presented as a graphical plot. Linear extrapolation of the graphical plot was used to determine the stretch value $\varepsilon_{onset}$ at which strain-induced crystallization commences.

At static stretch of 600%, a relative degree of crystallization $D_{c,\,600\%}$ of about 28% was observed. The onset of crystallization was detected at stretch values $\varepsilon_{onset}$ of approx. 350%.

Comparative Example 2

A cis-1,4-polyisoprene was produced under the same polymerization conditions as in Comparative Example 1. The cis-1,4-polyisoprene had a cis content of 98%. After performance of the polymerization, but before it had been stopped, $CO_2$ was further passed into the reaction solution as a modifier compound for end-group functionalization of the polyisoprene. This afforded a cis-1,4-polyisoprene having terminal carboxyl groups. The polymer solution obtained was stopped with isopropanol, stabilized with butylated hydroxytoluene, and freed of solvent in the conventional manner by coagulation/stripping.

The cis-1,4-polyisoprene produced was dissolved in chloroform (10% by weight). To the solution was then added 1% by weight of dicumyl peroxide (crosslinker) based on the polymer. After stirring sufficiently vigorously, the solvent was evaporated. A film having a thickness of 1 mm was thermally treated at 160° C. to initiate crosslinking of the polyisoprene.

The strain crystallization for the crosslinked composition is then determined according to the method described in Comparative Example 1.

At static stretch of 600%, a relative degree of crystallization $D_{c,\,600\%}$ of about 32.9% was observed. The onset of crystallization was detected at stretch values $\varepsilon_{onset}$ of approx. 350%.

Inventive Example 1

A cis-1,4-polyisoprene was first produced under the same polymerization conditions as in Comparative Example 1. After performance of the polymerization, but before it had been stopped, $CO_2$ was further passed into the reaction solution as a modifier compound for end-group functionalization of the polyisoprene. This afforded a cis-1,4-polyisoprene having terminal carboxyl groups. The cis-1,4-polyisoprene had a cis content of 98%. The polymer solution obtained was stabilized with butylated hydroxytoluene and freed of solvent by coagulation/stripping.

The cis-1,4-polyisoprene produced was dissolved in chloroform (10% by weight). To the solution was additionally added 0.4% by weight of L-alpha-lecithin (a phospholipid that functions as an amphiphilic compound) and 1% by weight of dicumyl peroxide (crosslinker), based on the polymer.

After stirring sufficiently vigorously, the solvent was evaporated. A film having a thickness of 1 mm was thermally treated at 160° C. to initiate crosslinking of the polyisoprene.

The strain crystallization for the crosslinked composition was then determined according to the method described in Comparative Example 1.

At static stretch of 600%, a relative degree of crystallization $D_{c,\,600\%}$ of 46.9% was observed. The onset of crystallization was detected at stretch values $\varepsilon_{onset}$ of approx. 300%.

Comparative Example 3

For comparison purposes, the strain crystallization was also determined on an identically vulcanized sample of natural rubber.

At static stretch of 600%, a relative degree of crystallization $D_{c,\,600\%}$ of 42.4% was observed. The onset of crystallization was detected at stretch values $\varepsilon_{onset}$ of approx. 200%.

With the composition according to the invention, which comprises the end-group-functionalized cis-1,4-polydiene and the amphiphilic compound, strain crystallization after crosslinking corresponding to almost that of natural rubber can be achieved.

The relative crystallinities at 600% stretch $S_{c,600\%}$ exceed that of the natural rubber sample (SRV) with identical crosslinking investigated as reference.

The invention claimed is:

1. A composition comprising:
   a crosslinkable synthetic cis-1,4-polydiene having a cis content of at least 95% and a functional group in the terminal position, and
   an amphiphilic compound,
   wherein the amphiphilic compound is a polar lipid.

2. The composition of claim 1, wherein the cis-1,4-polydiene is a cis-1,4-polyisoprene or a cis-1,4-polybutadiene or a mixture of these two polymers; and/or wherein the synthetic cis-1,4-polydiene is obtainable via a polymerization in the presence of a coordination catalyst that comprises a transition metal or a rare earth metal.

3. The composition of claim 1, wherein the terminal functional group is a carboxyl or carboxylate group, a hydroxyl group, an amine or ammonium group, an ester group or a cyano group.

4. The composition of claim 1, wherein the amphiphilic compound is present in the composition in an amount of not more than 30% by weight.

5. The composition of claim 1, additionally comprising a crosslinker, a sulfur, or a peroxide.

6. The composition of claim 1, wherein the polar lipid is phospholipid, a glycolipid, or an mixture thereof.

7. A process for producing the composition of claim 1, comprising following process steps:
   producing a cis-1,4-polydiene having a cis content of at least 95% by a polymerization in the presence of a coordination catalyst,
   attaching a functional group in the terminal position of the cis-1,4-polydiene, and
   mixing the cis-1,4-polydiene having a functional group in the terminal position with a polar lipid.

8. An elastomeric composition obtained by crosslinking the composition of claim 1.

9. A shaped body comprising the elastomeric composition of claim 8.

10. The shaped body of claim 9, wherein the shaped body is a tire, a medical device or an industrial rubber product.

* * * * *